US007957919B2

(12) United States Patent
Marconi

(10) Patent No.: US 7,957,919 B2

(45) Date of Patent: Jun. 7, 2011

(54) PROCESS FOR THE DETERMINATION OF THE CORRECT FUEL FLOW RATE TO A VEHICLE ENGINE FOR CARRYING OUT DIAGNOSTIC TESTS

(75) Inventor: Michele Marconi, Arbon (CH)

(73) Assignee: Iveco Motorenforschung AG, Arbon (CH)

( * ) Notice: Subject to any disclaimer, the term of this patent is extended or adjusted under 35 U.S.C. 154(b) by 1 day.

(21) Appl. No.: 12/266,933

(22) Filed: Nov. 7, 2008

(65) Prior Publication Data

US 2009/0138214 A1 May 28, 2009

(30) Foreign Application Priority Data

Nov. 12, 2007 (EP) .................................... 07120464

(51) Int. Cl.
*G01F 1/00* (2006.01)

(52) U.S. Cl. ......................................................... 702/45

(58) Field of Classification Search .................... 702/45, 702/114, 183, 185; 73/114.42, 861
See application file for complete search history.

(56) References Cited

U.S. PATENT DOCUMENTS

| | | | | |
|---|---|---|---|---|
| 5,018,069 | A * | 5/1991 | Pettigrew | 701/35 |
| 5,384,707 | A | 1/1995 | Kerns et al. | |
| 6,427,527 | B1 * | 8/2002 | Langer | 73/114.72 |
| 7,047,125 | B1 | 5/2006 | He et al. | |
| 2004/0088100 | A1 * | 5/2004 | Volponi | 701/100 |
| 2006/0005821 | A1 * | 1/2006 | Osumi et al. | 123/674 |
| 2006/0047405 | A1 | 3/2006 | Bouchain et al. | |
| 2007/0192019 | A1 | 8/2007 | Bohnig et al. | |
| 2007/0207888 | A1 | 9/2007 | Zell et al. | |

FOREIGN PATENT DOCUMENTS

| | | | |
|---|---|---|---|
| EP | 1 674 681 | * | 6/2006 |
| EP | 2 058 493 | * | 5/2009 |
| EP | 2 058 495 | * | 5/2009 |
| EP | 2 131 022 | * | 12/2009 |
| WO | WO 03/046354 | * | 6/2003 |
| WO | WO 2007/032714 | * | 3/2007 |

* cited by examiner

*Primary Examiner* — Michael P Nghiem

(74) *Attorney, Agent, or Firm* — Stetina Brunda Garred & Brucker

(57) ABSTRACT

A method for evaluation of the true fuel flow rate supplied to a test vehicle engine under various operation conditions is disclosed. The method includes the steps of determining the load applied to the tested engine by way of a deceleration test and determining the true fuel flow rate through the use of a reference engine of the same type as the tested engine, subjected to the load applied to the tested engine.

10 Claims, 1 Drawing Sheet

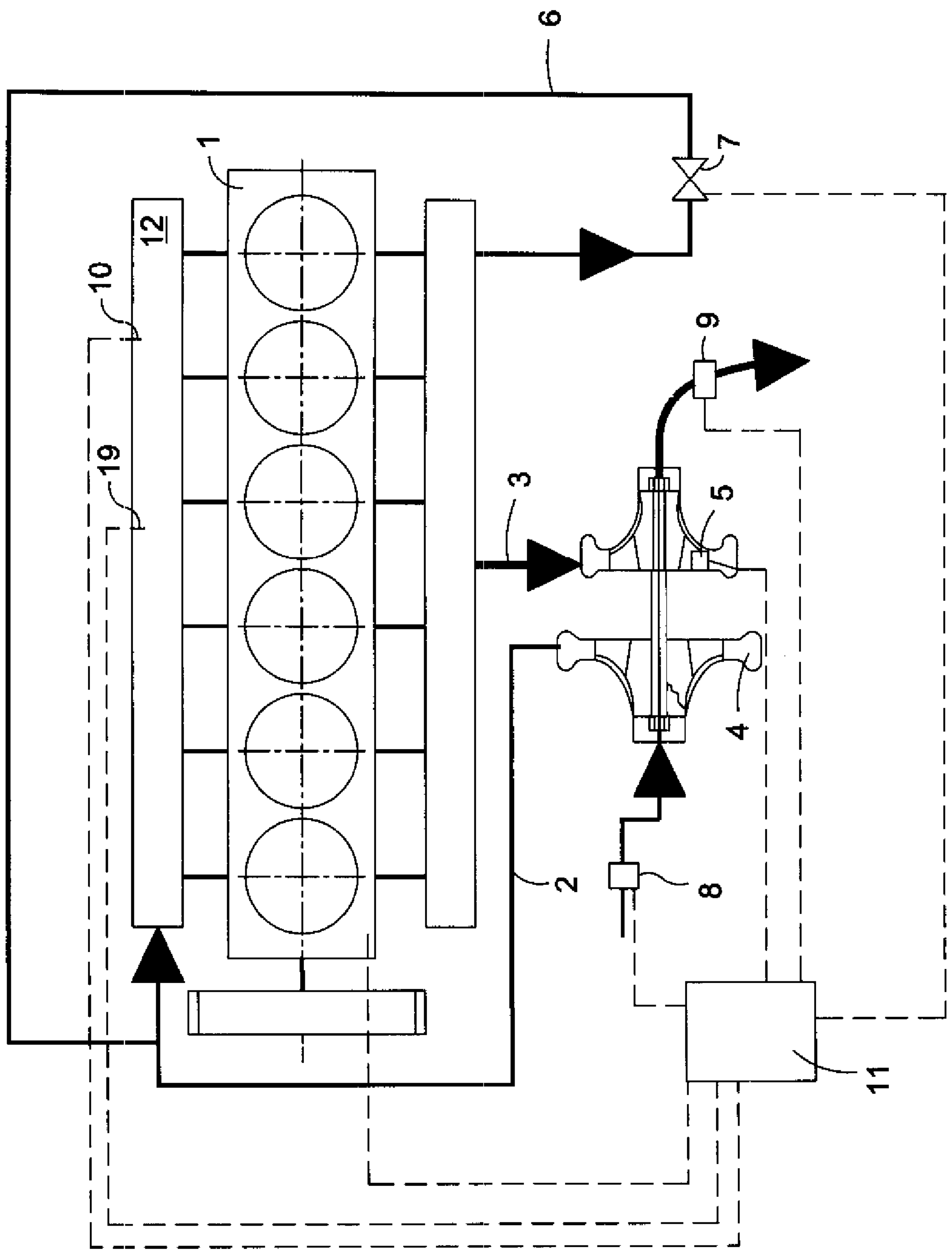
6
7
1
12
10
9
19
3
5
4
2
8
11

PROCESS FOR THE DETERMINATION OF THE CORRECT FUEL FLOW RATE TO A VEHICLE ENGINE FOR CARRYING OUT DIAGNOSTIC TESTS

CROSS-REFERENCE TO RELATED APPLICATIONS

Not Applicable

STATEMENT RE. FEDERALLY SPONSORED RESEARCH/DEVELOPMENT

Not Applicable

BACKGROUND

1. Field of the Invention

The present invention relates to a process for the determination of the correct fuel flow rate to a vehicle engine for carrying out diagnostic tests on a management system for said engine comprising operation sensors.

2. Prior Art

Very complex management systems are increasingly more necessary aboard vehicles, in particular industrial vehicles, for ensuring the correct operation of both the engine under all conditions of use and of the various on-board devices, such as the exhaust gas treatment, the exhaust gas recirculation devices. For example, the fuel injection, the opening of the recirculation line valve, the opening of the variable geometry turbine nozzle, where fitted, are generally controlled by specific control units according to the engine running conditions, the composition of exhaust gases from the engine and the conditions of the treatment devices. The detection of a series of parameters, which may be detected by means of sensors, is thus necessary for the operation of such management systems. Furthermore, the adjustment of the various control units must be sufficiently precise.

The following are among the components more frequently present aboard a vehicle, in particular a vehicle provided with a supercharged engine, and more in particular a diesel engine as those commonly applied to industrial vehicles. An air flow sensor, which is commonly located on the intake line, generally upstream of the supercharging compressor, a supercharging pressure sensor and a supercharging temperature sensor, generally located on the intake line downstream of the supercharging compressor (or compressors if there are more than one, as in the case of multiple stage supercharging or with compressors in parallel) prior to the introduction into the engine, for example the intake manifold. One or various exhaust gas composition sensors: in particular, there is generally a sensor adapted to detect the percentage of oxygen present in the exhaust gases, commonly known as lambda sensor (or probe). The latter is mainly used to adjust the fuel injection, in petrol engines provided with a catalyser. In the case of diesel engines, it is also necessary for a correct adjustment of the engine exhaust gas recirculation flow rate, so as to reduce the generation of pollutants or to guarantee exhaust gas conditions suited to the good operation of treatment systems (catalytic systems, particulate regenerative traps, etc.). Furthermore, in diesel engines there is an exhaust gas recirculation line which appropriately connects the intake line with the engine exhaust line. Various devices (pumps, Venturi tubes) may be provided (in particular in the case of recirculation on the high pressure branch between a point upstream of the turbine on the exhaust line in a point downstream of the intake line compressor, however if a sufficient distance between the recirculation line ends is not otherwise ensured) to allow a suitable flow of recirculated gases under all conditions. Moreover, the adjustment may be performed by means of a valve controlled by an electronic management system. The valve is completely closed if no recirculation is necessary.

The engine is adjusted as shown above according to the values measured by the sensors. The most common problems which may occur include incorrect detection of the intake air flow rate, due to the loss of calibration of the sensor, or to losses on the intake line (with the intake of external air downstream of the sensor if the loss is upstream of the compressor or the loss of air outwards if the loss is downstream of the compressor).

Furthermore, also the temperature and pressure sensors may be subject to error. The lambda sensor may also be subject to malfunctioning or incorrect calibration.

Another common problem is the evaluation error of the recirculated gas flow rate, for example due to valve losses, or other systematic errors, due to incorrect evaluations, for example of the volumetric efficiency (filling) of the engine.

Furthermore, the difficulty in the evaluation of the correct fuel injection flow rate represents a problem. It is indeed known that the flow rate supplied by the injectors is subject to considerable errors (for example approximately 2 mg/cycle) which, at a low load (minor fuel flow rates), may even be 20% of the true value and even exceed 30% when the engine is at a minimum number of rotations, which does not allow to distinguish other possible problems related to the detection sensors of the vehicle.

Since, as mentioned above, among the most common problems there is the incorrect calibration of the air flow rate sensor or errors in evaluating the flow rate due to losses, the control units may not periodically compare the measured flow rate values against a flow rate value calculated as from the supercharging temperature and pressure, the engine speed and the volumetric efficiency (obtainable according to the engine speed from normally available models). The air flow rate sensor may be recalibrated if a significant difference is detected. This method does not account for the fact that there may be other causes of error, whereby leading to the possible generation of systematic errors.

The presence of possible systematic errors is sometimes detected by means of diagnostic tests to be performed in a workshop, for example tests either scheduled or run according to needs. In order to obtain the data detected by the control unit, the control unit may further be connected in a known manner to an external control unit, such as a computer. However, it is often difficult, even if a fault is detected, to trace back to the possible cause without removing the components. Furthermore, the imprecise evaluation of the fuel flow rate represents a considerable limit to the possibility to rapidly identify other problems.

It would be desirable to be able to perform a diagnostic test capable of identifying the component on the basis of possible errors, reducing the need to remove the single components and/or to perform measurements with instruments external to the vehicle.

BRIEF SUMMARY

The above-identified problems have been solved according to the present invention by an evaluation process for the true fuel flow rate supplied to an examined vehicle engine, in particular an industrial vehicle, the process including: the determination of a reference fuel flow rate, corresponding to the exact flow rate measured on a reference engine of the same type as the tested engine under various operation conditions as a function of a load the engine is subjected to; the measurement of the deceleration ($\Delta n/\Delta t$) of the tested engine from a first to a second preset rotation speed, in the absence of fuel supply, corresponding to a load the engine is subjected to; the determination, based on said deceleration, and based on the actual operation conditions of the engine under similar load conditions, of the corresponding reference flow rate.

The reference flow rate is preferably determined as a function of the rotation speed of the engine at least, and may also be determined as a function of other operation conditions, for example ambient pressure and temperature.

Said true flow rate may be compared to the flow rate indicated by an operation management system of the engine adapted to control the injection flow rate and used for the calibration of said system.

The invention also relates to a diagnostic method for a management system of a vehicle engine including said process and the use of the true flow rate value for the determination of possible faults.

The true flow rate value may be used by a system aboard the vehicle, or by an electronic apparatus, which may be connected to the vehicle management system while the diagnostic tests are carried out.

The correction of the flow rate value or the calibration may also consist in the simple validation of the flow rate value, if this is sufficiently similar to the true flow rate.

It is an object of the invention the content of the appended claims.

BRIEF DESCRIPTION OF THE DRAWINGS

The present invention will now be illustrated by means of the detailed description of preferred though not exclusive embodiments, provided by way of example only, with the aid of the accompanying figure which shows the diagram of a supercharged engine apparatus with exhaust gas recirculation to which the process according to the following invention may be applied.

DETAILED DESCRIPTION

The process according to the present invention is preferably applicable to a vehicle, preferably an industrial vehicle, which is provided with an engine apparatus comprising an internal combustion engine 1, preferably a diesel engine, an intake line 2 and an exhaust gas line 3. According to a possible embodiment, the intake line may comprise a supercharging compressor 4 and the exhaust line may comprise a turbine 5 adapted to drive the compressor, the turbine possibly being of the variable geometry type, according to a particular embodiment of the invention. As normally occurs, an exhaust gas recirculation line 6 may be provided connecting two appropriate points of the exhaust and intake lines. Specific means (not shown), intrinsically known, such as pumps or Venturi devices may be provided to allow a suitable flow rate of recirculated gases in line 6. A recirculation valve 7 serves to adjust said flow rate. The recirculation line may connect the high pressure branches of the engine intake and exhaust lines, i.e. connects a point upstream of the turbine 5 to a point downstream of the compressor 4. However, ricirculation may also be performed otherwise. An air flow rate sensor 8 is arranged on the intake line, preferably upstream of the compressor. A lambda sensor 9 is arranged at an appropriate point of the exhaust line. A temperature sensor 19 and a pressure sensor 10 detect such parameters in an appropriate point downstream of the compressor, preferably downstream of the recirculated gas reintroduction point, for example in the intake manifold 12.

An engine operation management system 11, which may be a customary electronic unit, is adapted to receive signals from the various sensors, so as to detect other operating parameters in a known manner, among which the engine rotation speed, for controlling various components, such as, for example, the injectors, for determining the injected fuel flow rate and valve 7 for adjusting the recirculation flow rate according to the collected data, and, if present, the opening of variable geometry turbine nozzle 13, or possible valves. Therefore, such a management system is adapted to control the fuel injection. The control unit also receives data regarding the torque and the power required by the engine according to the driver's commands. Other sensors and controls may be present in the system, and also be used by the control unit, such as temperature sensors for example in the exhaust gas line, especially in the presence of gas treatment systems, such as catalytic converters, regenerative traps, or other. During the maintenance operation, the unit may preferably be externally controlled, for example, it may be connected to an external control apparatus, such as a computer and it may send the detected operating data to it. The unit may be controlled by the external apparatus, in order to operate on the various components (for example injection, opening of variable geometry turbine, opening of recirculation valve, operation of other components such as the engine cooling fan).

According to a possible diagnostic method applicable to an engine apparatus such as that shown, on the basis of the data detected by the unit 11, the unit itself, or the external apparatus may determine three magnitudes, the comparison of which may be carried out and indicate possible faults.

For example, these may be three true or virtual air flow rates: $Air_{HFM}$ is the flow rate detected by the flow rate sensor 8; $Air_{asmod}=\alpha' * p_{boost}/T_{boost} * V_m * E_v$; this is the virtual air flow rate calculated from $p_{boost}$ and $T_{boost}$ which are respectively the supercharging pressure and temperature; furthermore, $V_m$ is the engine rotation speed ($s^{-1}$) and $E_v$ the volumetric efficiency (a volume). The volumetric efficiency is a datum available from models generally available for a certain type of engine mainly according to $V_m$, these models also possibly taking other parameters into account. Finally: $Air_{lsu}=\lambda * A/F_{st} * Q_f$, is an air flow rate value where $\lambda$ is the value calculated from the oxygen concentration, as a function of the oxygen content in pure air, measured by the sensor with the corrections depending on the features of the sensor used and on the environmental parameters in which the sensor is used, $A/F_{st}$ is the stoichiometric air-fuel ratio, $Q_f$ is the injected fuel flow rate per time unit. The indicated air flow rates may be mass flow rates for convenience, although it is also possible to calculate volumetric flow rates, if preferred.

The three flow rates may be determined under conditions in which there must be no recirculation flow rate, which may be imposed by the control unit by controlling the external apparatus, for example, more generally by closing the valve 7, but also by operating other types of recirculation means if present and other than a valve. In case the three flow rates determined do not match, according to the deviated value, accompanying Table 1 allows to make a first choice; the table is easily explained. "OK" indicates a correct flow rate; "deviation +" and "deviation −" respectively correspond to a determined value for a magnitude considered greater or smaller than the true flow rate value. If reference values allowing to describe the behaviour of the engine under test conditions are available, it is easy to immediately determine if a value is correct and which value this is.

The diagnostic operations may be performed as follows.

With the engine off, it is verified whether the air flow rate sensor indicates a null value and whether the supercharging pressure sensor indicates the ambient pressure.

Having set the reference values shown above, at low engine speed the values are compared with the reference values which are commonly found for engines (such values are affected by the environmental conditions, such as altitude, which may also be taken into account) but not by the back pressure to the exhaust. In case of deviation of the measured air flow rate, the scope may be restricted to the cases of a deviation of the air flow rate sensor or to losses in the supply line, although there may also be a loss in the recirculation system, in particular a leakage of recirculation gas with the valve closed, in particular if the value $Air_{lsu}$ also deviates. If the $Air_{asmod}$ value is wrong, on the other hand, an error of the supercharging temperature sensor may be assumed, if in the previous test no faults of the pressure sensor were detected (and furthermore if no possible deviations of the pressure value are detected even if the previous reference value is correct).

Tests at stationary reference rates may then be performed, for example 3, (low, medium and high rotation speed), again with the recirculation line closed, to explore the entire possible range of air flow rates. In order to increase the supercharging pressure, the variable geometry turbine nozzle may be closed (controlled by the control unit). Furthermore, the engine cooling fan may be operated, again remitting such a command to the control unit, as on industrial vehicles the fan absorbs high powers, such that it is generally directly driven by the engine shaft. Furthermore, overheating during the test is avoided. Thus, on a customary industrial vehicle it has been found that in general the entire intake air flow rate range and approximately half or even more of the supply pressure field may by explored, again by comparing the values of the three magnitudes even in a workshop test. The adoption of at least 2, preferably 3 but even more operating points, further allows to evaluate the linearity of the deviations measured by the sensors, which may give more precise information on possible faults.

During a deceleration step, with cut-off fuel supply, a calibration point of the lambda sensor (which must indicate a percentage by volume of $O_2$ of 20.95%) is verified.

Finally, a series of tests with different gas recirculation flow rates may be performed by opening the valve. As apparent by comparing case 6 in table 1, a decrease of the $Air_{hfm}$ air flow rate (part of the gases supplied to the engine do not come from the outside) and of the $Air_{lsu}$ air flow rate should be expected, whereas the $Air_{asmod}$ flow rate is affected only slightly by the composition of the gases which is altered by the presence of recirculation and should represent the nearly correct gas flow rate through the engine. This is true when keeping the engine speed constant. The operation parameters of the engine which are to be maintained constant are indeed directly set by the tester, by means of remote control commands which, for example, impose to the control unit the rotation speed to be maintained, the position of the valve of the exhaust gas recirculation line (EGR valve) and the variable geometry turbine (VGT) position. Without this kind of control a minimum variation of a operation condition (for example, the engine's temperature with a subsequent influence on friction) would cause a deviation of the engine rotation speed. The remaining actuators, which are not driven, proceed according to the normal settings determined by the engine's control unit. In this case, there is only a minor deviation due to the increase of the supercharging temperature and the reduced supercharging pressure because gases are subtracted from the turbine, if the recirculation is on the high pressure branch. Thus, it is also possible to observe whether the decrease of $Air_{hfm}$ and $Air_{lsu}$ depends linearly on the growth of the recirculated exhaust flow rate, which should depend in a known manner on the opening of the valve.

By performing the tests as mentioned above, in case the results are those expected by the test, one may express an opinion of full functionality of the entire engine management system.

As may be noted in table 1, an evaluation is possible if the values differ.

If the value of $Air_{lsu}$ differs from the other two which agree, a problem with the lambda sensor may be considered. If not detected in the deceleration test, there may however be a problem with the lambda sensor, especially if the flow rate value of the fuel is correct with respect to the reference values. Otherwise, it is likely that there is an incorrect evaluation of the fuel flow rate.

If it is the value of $Air_{asmod}$ that differs from the other two, which instead match, there may be a temperature or pressure sensor problem, or an undesired introduction of recirculation gas (valve leakage). The above-listed tests under various conditions also allow to identify the component which generates the problem (and also the nature of the problem): for example, if the deviation of $Air_{asmod}$ does not occur with the engine off and all the values agree at this point but the deviation appears only at high load, there is a deviation of either the pressure or the temperature sensor.

If the only different value is $Air_{hfm}$, a fault to the air flow rate sensor may have occurred (possibly detectable if there is an offset with the engine-off test, or with a test at other flow rates if the problem is a non-linearity of response), or a loss in the intake line which gives a decreased value of $Air_{hfm}$ if the loss is upstream of the compressor or an increased value if the loss is downstream (see table).

The above-listed tests under different conditions may be performed in the order shown or in an other order, if preferable.

By operating according to the present invention, it should be noted that once the presence of a fault is detected, it is possible to decide on a case-by-case basis which subsequent test is appropriate to be conducted in order to identify the possible cause of the fault more rapidly.

After having identified the cause, it is possible to calibrate the component or perform the necessary interventions.

Furthermore, it is possible to find other groups of three different magnitudes to be compared, again correlated with at least part of the above-indicated parameters. For example, the relationships between the above-determined air flow rates may be identified. Thus, by varying a condition which affects both flow rates of a relationship, it may be easier to observe whether both have a linear deviation.

Otherwise, it is also possible to determine, from the air flow rates $Air_{asmod}$ and $Air_{hfm}$ and from oxygen values measured by the lambda sensor, virtual fuel flow rates and to evaluate their deviation with respect to $Q_f$. This may be done when it is required to highlight the value of $Q_f$.

As mentioned, the injection system, especially at a low load, may be subjected to a considerable error in the quantification of the flow rate value $Q_f$. For such a reason it may be difficult to distinguish other possible faults, if operating by a diagnostic method, which may be that set forth above, or any other method based on a correct evaluation of the flow rate $Q_f$. For example, in the case of a deviation in $Air_{lsu}$ such an error is such as to cover up possible errors in the evaluation of the oxygen content, by the lambda sensor, on which tolerances may be allowed which are as broad as those normally occurring on the fuel flow rate, to allow the management system of the engine apparatus to operate appropriately. Furthermore, faults by multiple components may not be easily detected. Therefore, a calibration of the injection system or in any case of the apparatus with which the diagnostic method is carried out, at least while the latter is carried out, or at least the error in the fuel flow rate must be precisely detected under conditions in which the various tests are carried out in order to exclude other possible faults.

Reference values may be obtained correlating the fuel flow rate under stationary operating condition of the engine, at least under conditions allowing to carry out a test in the workshop. These data may be obtained in a laboratory on the same version as the tested engine and with different load values to which the engine (torque) is subjected. Indeed, even under similar operating conditions, a series of aspects, which may be the structural features of the individual engine (for instance cylinder and piston, and bushing tolerances) or friction causes which may be incidental or vary among tests (for example, the kind of lubricant and the temperature thereof, the different loads such as the driving of various apparatuses such as the alternator, the hydraulic power steering pump, the cooling fan, the conditioning compressor . . . ) make the load the engine is subjected to, different and irreproducible on different engines even of the same version and among tests, even if a load due to the vehicle motion is not applied.

In order to evaluate the load due to these causes, a deceleration test may be carried out without fuel supply between two preset operation conditions (two different rotation speeds) and the torque due to friction may be evaluated. For example, the test may be carried out at the same time as the checking of the lambda sensor without the fuel supply mentioned above, for example for tests at various rotation speeds. The time $\Delta t$ in which the engine passes from a higher rotation speed to a lower speed thus decreasing the number of rounds per minute by $\Delta n$, is measured.

The friction torque may be evaluated as $M_d = I*(\Delta n/\Delta t)*2\pi/60$, where I is the momentum of inertia of the rotating parts of the engine, a value easily available for a given version. On the basis of such a torque value the true flow rate value $Q_f$ may be determined under the various conditions the diagnostic method is carried out in, to directly be used for the computations or for the calibration of the injection system forming the management system or the apparatus used for the diagnostic method.

Of course the reference values may be a function of the various conditions among which the torque or a value corresponding to the load or correlated thereto (for example the deceleration under predetermined conditions). They may be obtained as functions or tables.

The process according to the present invention allows, if applied to a diagnostic method such as that described, to increase the reliability of the test and also distinguish possible cases in which there are errors or malfunctioning caused by two different sources. A specific type of diagnostic test has been described by way of example, the diagnostic test being applied to a specific type of engine, although the process according to the present invention may also be applied to other types of tests on the basis of the knowledge of the true fuel flow rate supplied, even on engines of other kind, for example even without supercharging or exhaust gas recirculation, making the appropriate modifications.

The invention also relates to a computer program, as said control unit and/or apparatus may be considered, adapted to implement the process or to a diagnostic method comprising such a process.

The invention also relates to a management system for the operation of an engine and electronic apparatus adapted to be connected to a management system for the operation of an engine, adapted to carry out a process or a diagnostic method as defined above.

TABLE 1

| Case | Problem or non-calibrated/faulty component | $Air_{HFM}$ | $Air_{ASMOD}$ | $Air_{LSU}$ |
|---|---|---|---|---|
| 1 | Air flow rate sensor (HFM) | Deviation+/− | OK | OK |
| 2 | Intake line loss upstream of the compressor | Deviation− | OK | OK |
| 3 | Intake line loss downstream of the compressor | Deviation+ | OK | OK |
| 4 | Supercharging pressure sensor | OK | Deviation+/− | OK |
| 5 | Supercharging temperature sensor | OK | Deviation+/− | OK |
| 6 | Recirculation valve loss (EGR) | Deviation− | ≈OK | Deviation− |
| 7 | Volumetric efficiency error | OK | Deviation+/− | OK |
| 8 | Fuel flow rate value error | OK | OK | Deviation+/− |
| 9 | Lambda sensor | OK | OK | Deviation+/− |

What is claimed is:

1. A diagnostic method for the determination of a true fuel flow rate supplied to a tested vehicle engine under various operating conditions, in particular an industrial vehicle, the method including:

determination of a load applied to the tested vehicle engine by deceleration ($\Delta n/\Delta t$) of the tested vehicle engine from a first to a second preset rotation speed, in an absence of fuel supply;

determination of the true fuel flow rate as reference fuel flow rate, corresponding to a flow rate measured on a reference engine of a same type as the tested vehicle engine as a function of the load the tested vehicle engine is subjected to wherein the true flow rate value is utilized to determine possible faults;

detection of a series of parameters comprising:

intake air flow rate ($Air_{hfm}$) by a specific sensor (8);

supercharging pressure ($p_{boost}$) and supercharging temperature ($T_{boost}$) by appropriate sensors (19, 10);

percentage of oxygen ($\lambda$) present in the exhaust gases is sensed by an appropriate sensor, including a lambda sensor (9);

flow rate of fuel ($Q_f$) supplied to the engine per time unit;

determination of three mathematically independent magnitudes of air flow rates each based on at least part of said parameters; and comparison of said three magnitudes, for the determination of possible operation faults, characterized in that said fuel flow rate ($Q_f$) is said true flow rate.

2. A diagnostic method according to claim 1, characterized in that the diagnostic method is carried out by an electronic system for management of the tested vehicle engine or by an electronic apparatus connected to a management system.

3. A diagnostic method according to claim 1, wherein said true flow rate value is compared with an indicated flow rate value, by a management system for the operation of the tested vehicle engine.

4. A method according to claim 1, characterized in that said three magnitudes are the intake air flow rate ($Air_{hfm}$) detected by the sensors (8, 9, 10, 19), an intake air flow rate ($Air_{asmod}$) calculated according to said supercharging temperatures and pressure, the first and second preset engine rotation speeds and a volumetric efficiency value ($E_V$); an intake air flow rate ($Air_{lsu}$) calculated from the supplied true fuel flow rate and the percentage of oxygen in the exhaust gases.

5. A diagnostic method according to claim 4, characterized in that said flow rate is compared with an indicated flow rate, by a management system for the operation of the tested vehicle engine.

6. A method according to claim 1, characterized in that said three magnitudes are a first virtual fuel flow rate calculated from the intake air flow rate ($Air_{hfm}$) detected by the sensors (8, 9, 10, 19) and from the percentage of oxygen measured in the exhaust gases, a second virtual fuel flow rate calculated on a basis of said supercharging temperature and pressure, the first and second engine rotation speeds, a volumetric efficiency value ($E_v$), the percentage of oxygen measured in the exhaust gases, and said true fuel flow rate.

7. A diagnostic method according to claim 6, characterized in that said flow rate is compared with an indicated flow rate, by a management system for the operation of the tested vehicle engine.

8. A diagnostic method according to claim 1, characterized in that said flow rate is compared with an indicated flow rate, by a management system for the operation of the tested vehicle engine.

9. A diagnostic method according to claim 1 characterized in that the method is carried out by a management system for operation of an engine.

10. A diagnostic method according to claim 1 characterized in that the method is carried out by an electronic apparatus adapted to be connected to a management system for operation of an engine.

* * * * *